US009407735B2

(12) United States Patent
Valenza et al.

(10) Patent No.: US 9,407,735 B2
(45) Date of Patent: Aug. 2, 2016

(54) FLOW MATCHING OPTIMIZATION IN SCALED ENVIRONMENTS

(71) Applicant: CISCO TECHNOLOGY, INC., San Jose, CA (US)

(72) Inventors: Salvatore Valenza, Pomy (CH); Domenico Ficara, Essertines-sur-Yverdon (CH); Roberto Muccifora, Ropraz (CH); Leo Caldarola, Morrens (CH)

(73) Assignee: Cisco Technology, Inc., San Jose, CA (US)

( * ) Notice: Subject to any disclaimer, the term of this patent is extended or adjusted under 35 U.S.C. 154(b) by 54 days.

(21) Appl. No.: 14/486,556

(22) Filed: Sep. 15, 2014

(65) Prior Publication Data

US 2015/0358435 A1    Dec. 10, 2015

Related U.S. Application Data

(60) Provisional application No. 62/010,284, filed on Jun. 10, 2014.

(51) Int. Cl.
*H04L 12/50* (2006.01)
*H04L 29/06* (2006.01)

(52) U.S. Cl.
CPC .................... *H04L 69/22* (2013.01)

(58) Field of Classification Search
CPC .................. H04L 12/40097; H04L 12/40189; H04L 49/1523; H04L 12/525; H04L 49/901; H04L 41/069; H04L 45/54; H04Q 11/06; H04Q 11/04; H04Q 11/08; H04Q 2213/13176
USPC ......... 370/364, 368, 371, 374, 378, 379, 381, 370/382, 383, 395.32, 395.2
See application file for complete search history.

(56) References Cited

U.S. PATENT DOCUMENTS

| 6,754,662 | B1* | 6/2004 | Li | G06F 17/30949 707/693 |
| 6,757,742 | B1* | 6/2004 | Viswanath | H04L 29/12018 370/389 |
| 6,925,085 | B1* | 8/2005 | Krishna | H04L 45/745 370/389 |
| 7,602,787 | B2* | 10/2009 | Cheriton | G06F 17/30949 370/392 |
| 9,075,836 | B2* | 7/2015 | Matsakis | G06F 17/3033 |
| 2008/0192754 | A1* | 8/2008 | Ku | H04L 45/00 370/395.32 |
| 2011/0060876 | A1* | 3/2011 | Liu | G06F 17/30949 711/108 |
| 2012/0137060 | A1* | 5/2012 | Akerib | G11C 15/00 711/105 |

(Continued)

OTHER PUBLICATIONS

CiteSeer, "All-match based complete redundancy removal for packet classifiers in TCAMs", A. Liu et al., 2008.

(Continued)

*Primary Examiner* — Brenda H Pham
(74) *Attorney, Agent, or Firm* — Cindy Kaplan

(57) ABSTRACT

In one embodiment, a method includes identifying at a network device, a number of items for matching at a hash table, the number of items exceeding matching available with ternary content addressable memory (TCAM) at the network device, defining at the network device, an optimal cyclic redundancy check (CRC) polynomial based on the number of items for matching at the hash table, and generating at the network device, an optimal hash function based on the optimal CRC polynomial to extend packet classification capability at the network device. An apparatus is also disclosed herein.

20 Claims, 7 Drawing Sheets

(56) References Cited

U.S. PATENT DOCUMENTS

2012/0275466 A1* 11/2012 Bhadra ............... H04L 47/2441
 370/419
2014/0040317 A1 1/2014 Valenza et al.

OTHER PUBLICATIONS

IEEEXplore, "TCAM Razor: A Systematic Approach Towards Minimizing Packet Classifiers in TCAMs", A. Liu et al., Oct. 30, 2009.
"Bit Weaving: A Non-Prefix Approach to Compressing Packet Classifiers in TCAMs", C. Meiners et al., Apr. 2012.

* cited by examiner

FLOW MATCHING OPTIMIZATION IN SCALED ENVIRONMENTS

STATEMENT OF RELATED APPLICATION

The present application claims priority from U.S. Provisional Application No. 62/010,284, entitled FLOW MATCHING OPTIMIZATION IN SCALED ENVIRONMENTS, filed on Jun. 10, 2014. The contents of this provisional application are incorporated herein by reference in its entirety.

TECHNICAL FIELD

The present disclosure relates generally to communication networks, and more particularly, to packet classification.

BACKGROUND

SDN (software-defined networking) is one example in which controllers experience an increasing demand of managing multiple flows associated with multiple network nodes. This often results in enabling packet classification on the network nodes so that the controller can analyze network traffic.

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
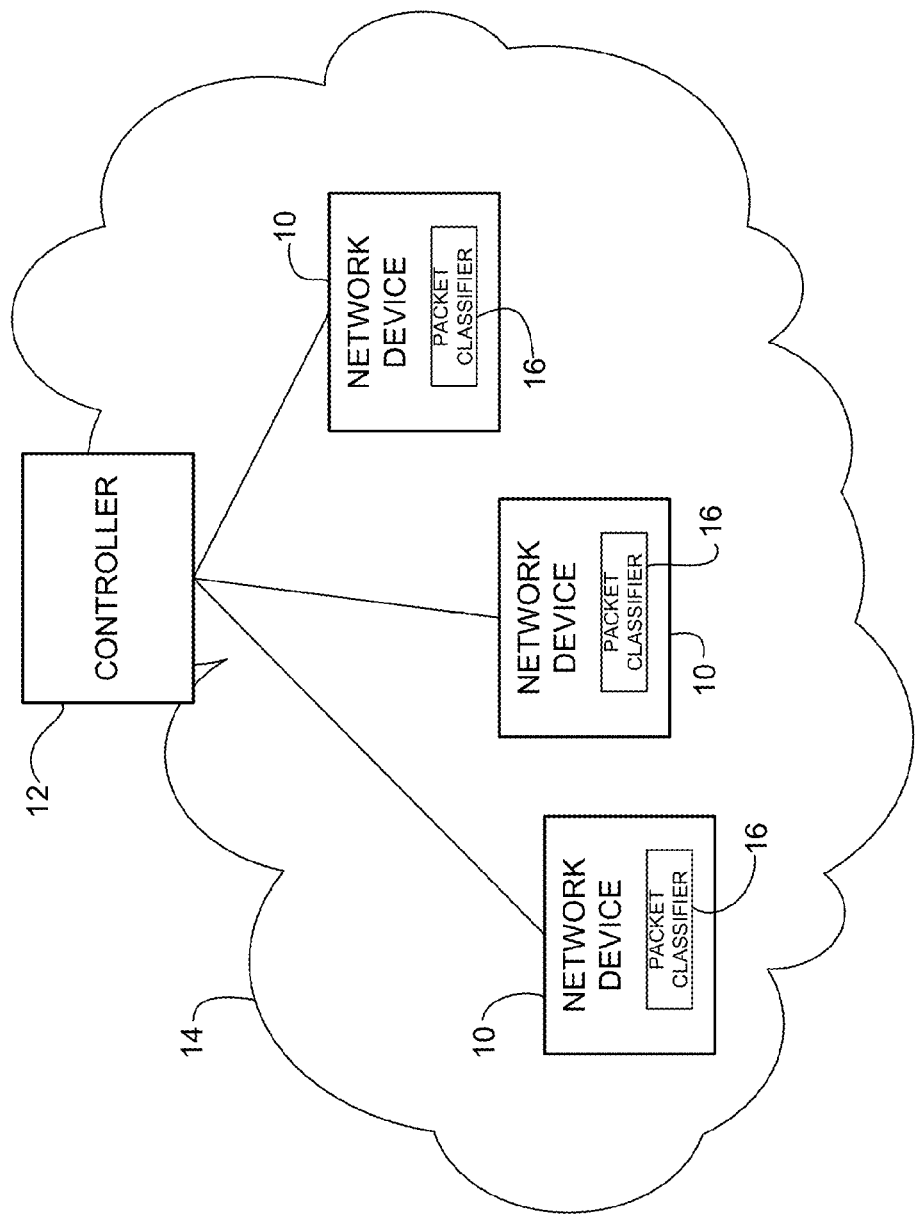
FIG. 1 illustrates an example of a network in which embodiments described herein may be implemented.

In one embodiment, a method generally comprises identifying at a network device, a number of items for matching at a hash table, the number of items exceeding matching available with ternary content addressable memory (TCAM) at the network device, defining at the network device, an optimal cyclic redundancy check (CRC) polynomial based on the number of items for matching at the hash table, and generating at the network device, an optimal hash function based on the optimal CRC polynomial to extend packet classification capability at the network device.

In another embodiment, an apparatus generally comprises a processor for identifying a number of items for matching at a hash table, the number of items exceeding matching available with ternary content addressable memory (TCAM), defining an optimal cyclic redundancy check (CRC) polynomial based on the number of items for matching at the hash table, and generating an optimal hash function based on the optimal CRC polynomial to extend packet classification capability at the apparatus. The apparatus further comprises memory for storing the hash table.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

SDN (software-defined networking) solutions are starting to be ubiquitously managed in routers, switches, and other network devices. There is an increasing demand for managing multiple flows associated with multiple network nodes within SDN controllers. This often translates into enabling packet classification functionalities on the network nodes so that the controller can analyze and take actions based on application or network status.

The use of Ternary Content Addressable Memory (TCAM) to perform high-speed packet classification has become the de facto standard in industry since TCAMs can facilitate constant time classification by comparing a packet with all rules of ternary encoding in parallel. Despite their high speed, TCAMs have limitations due to small capacity, and may not be able to provide sufficient capacity to address the increasing request of packet matching and punting (e.g., moving packet from one path to another for processing and handling).

The embodiments described herein implement processing that is used to extend the TCAM functionality and expand overall classification capability. The classification capability may be increased, for example, to the limit defined by the CPU (central processing unit) of the system. The matching capability may be extended, for example, in the range of 2 to 64 times the TCAM matching capability, in one or more embodiments.

Network processors that control TCAM based classification may also support hashing and CRC (cyclic redundancy check) functionalities. As described in detail below, these functions may be used to implement one or more embodiments for flow matching optimization. For example, certain embodiments extend the TCAM matching capability by adding optimal hashing. In one embodiment, a polynomial generator of a CRC is used to define the optimal hash function for a matchable list configured on the system by operators or SDN controllers. For example, the hash function may be based on a CRC for which an optimal polynomial is determined from the item set to be matched, which can change at runtime. In certain embodiments, the hash table may be filled with minimal depth WAVL (weak Adelson-Velskii and Landis) trees, to provide fast searches and matches.

Referring now to the drawings, and first to FIG. 1, a simplified example of a network in which embodiments described herein may be implemented is shown. The embodiments operate in the context of a data communication network including multiple network elements. For simplification, only a small number of network nodes are shown. The example illustrated in FIG. 1 includes network devices 10 in communication with a controller 12. In one example, the controller 12 comprises an SDN (software-defined networking) controller. The controller 12 may be in communication with any number of nodes 10 or networks 14. The SDN controller 12 may manage multiple flows associated with the network nodes 10. Packet classification may be enabled on the network devices 10 so that the controller 12 can analyze and take actions based on application or network status.

Data flow paths between the network nodes 10 and controller 12 may include any number or type of intermediate nodes (e.g., routers, switches, gateways, or other network devices) and communication links, which facilitate passage of data between the nodes. Network traffic may traverse one or more networks 14 (e.g., local area network, virtual local area network, metropolitan area network, wide area network, enterprise network, Internet, intranet, radio access network, public switched network, or any other network).

The network device 10 may comprise, for example, a router, switch, or any other network device. In the example shown in FIG. 1, the network device 10 comprises a packet classification module (packet classifier) 16 operable to perform flow matching optimization, as described herein.

It is to be understood that the network shown in FIG. 1 and described herein is only an example and that the embodiments may be implemented in networks having different network topologies or network devices or for use in different applications, without departing from the scope of the embodiments.

Figure 2:
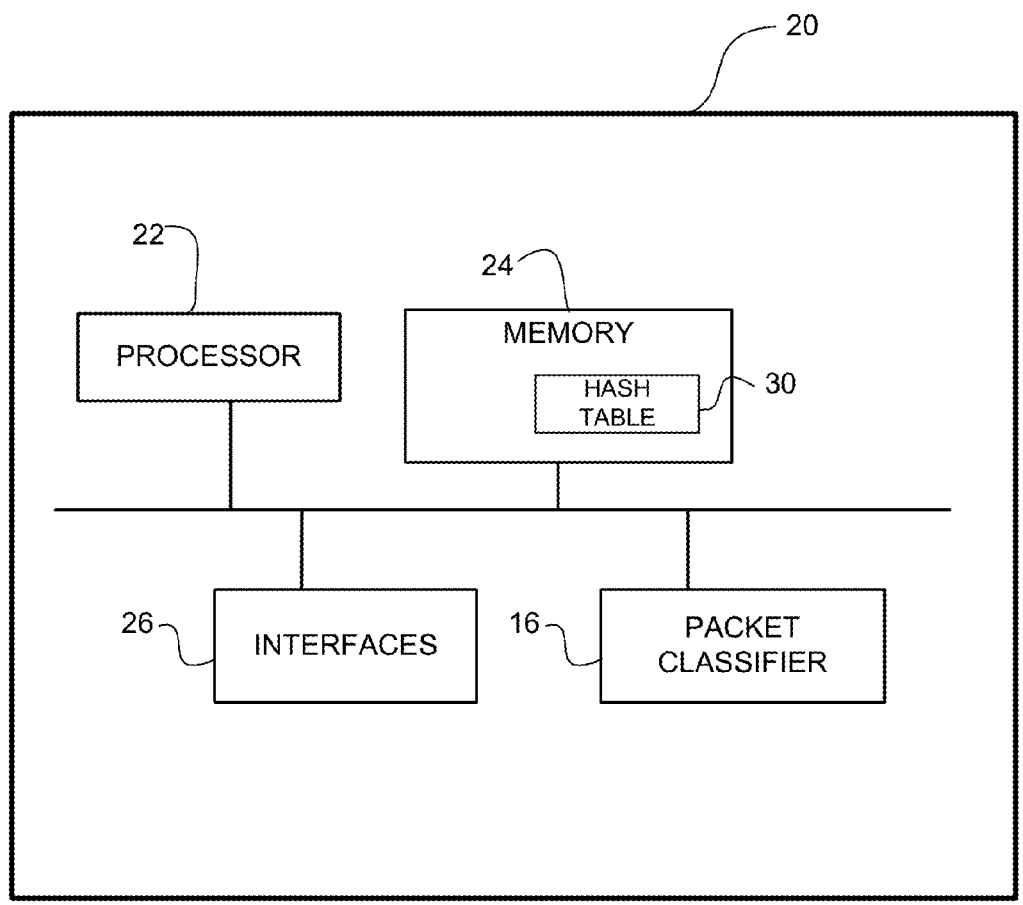
FIG. 2 depicts an example of a network device useful in implementing embodiments described herein.

FIG. 2 illustrates an example of a network device 20 that may be used to implement the embodiments described herein. In one embodiment, the network device 20 is a programmable machine that may be implemented using any suitable combination of hardware, firmware, and software. The network device 20 includes one or more processor 22, memory 24, network interfaces 26, packet classifier 16, and hash table 30. The packet classifier 16 may be implemented using any suitable combination of hardware, firmware, and software.

Memory 24 may be a volatile memory or non-volatile storage, which stores various applications, operating systems, modules, and data for execution and use by the processor 22. Memory 24 may store hash table 30 or one or more components of the packet classifier 16, for example.

Logic may be encoded in one or more tangible media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. The computer-readable medium may be a non-transitory computer-readable storage medium, for example.

One or more of the processors 22 may implement hash or CRC functionalities. These functions may be implemented in hardware, for example. As described in detail below, hashing and CRC may be used to extend TCAM matching capabilities.

The network interfaces 26 may comprise any number of interfaces (linecards, ports) for receiving data or transmitting data to other devices. The network interface 26 may comprise, for example, an Ethernet interface.

It is to be understood that the network device 20 shown in FIG. 2 and described above is only an example and that different configurations of network devices may be used. For example, the network device 20 may further include any suitable combination of hardware, software, algorithms, processors, modules, devices, mechanisms, components, or elements operable to facilitate the capabilities described herein.

Figure 3:
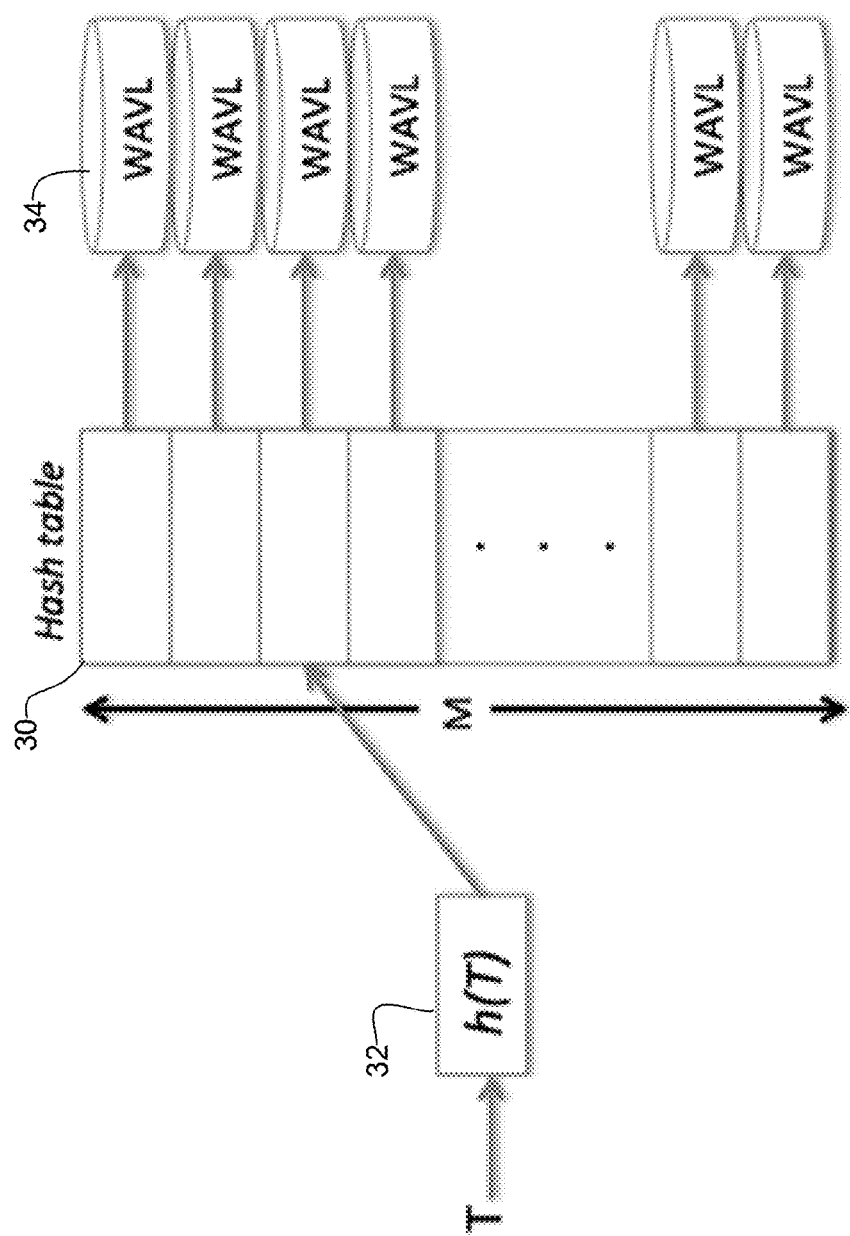
FIG. 3 illustrates an example of a schema for hash and WAVL access, in accordance with one embodiment.

FIG. 3 illustrates hash and WAVL access, in accordance with one embodiment. In certain embodiments, hash machines available on one or more processors 22 may be used to implement the hash table 30 shown in FIG. 3. In one embodiment, if the number of "matchable" items configured in the system overcomes the maximum number of possible TCAM entries (that may be used for forwarding matching), subsequent processing may be enabled. For example, when a tuple T has to be matched, instead of just checking it only at TCAM level, a hashing function h(T) (indicated at 32 in FIG. 3) may be applied to the incoming tuple and depending on the result of the hashing at the hash table 30, a small WAVL tree 34 may be accessed to check if the tuple received is one of the configured items, so that punting may be executed on the incoming packet.

In order to optimize this flow matching process, an optimal hash function 32 may be selected to be fast and able to distribute uniformly the searchable items on the hash table 30. For example, if the hash table 30 has size M (as depicted in FIG. 3), a maximum of N/M items can be found on the WAVL tree 34 attached to a single entry in the hash table 30, where N is the number of items configured.

As previously noted, network processors 22 may also implement CRC functionalities, and some may allow specifying the CRC polynomial to be used on the CRC evaluation. In one or more embodiments, these CRC machines may be used as hash function generators. As described below, it may be determined for a specific set of items, if an "optimal" polynomial exists and what that polynomial is.

Figure 4:
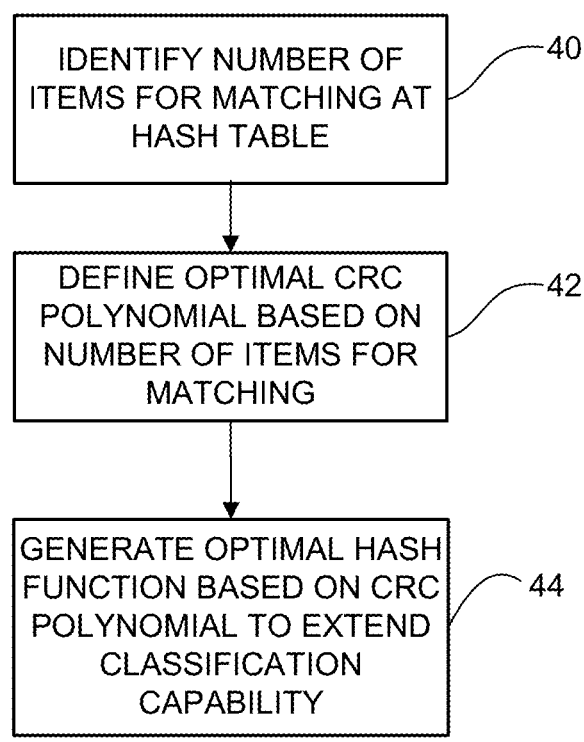
FIG. 4 is a flowchart illustrating an overview of a process for flow matching optimization, in accordance with one embodiment.

FIG. 4 is a flowchart illustrating an overview of a process for flow matching optimization, in accordance with one embodiment. At step 40 a network node (e.g., network device 10 in FIG. 1) identifies the number of items for matching on a hash table (e.g., hash table 30 in FIG. 3). If the number exceeds matching available with TCAM, additional processing is enabled (steps 42 and 44). The network device 10 defines an optimal CRC polynomial mapping items to the hash table (step 42). An optimal hash function is generated based on the optimal CRC polynomial (step 44). As described above with respect to FIG. 3, the hash table may be filled with AVL trees (e.g., WAVL sub-trees). In one embodiment, a maximum number of matchable items is defined based on processor parameters at the network device (e.g., overall CPU power of the system) to determine the maximum allowable number of items for matching by the system without delaying packet forwarding. An example of an algorithm to identify the optimal CRC polynomial mapping items (e.g., tuples) to a hash table is described below, along with usage of the algorithm to extend TCAM matching capability to a limit allowed by power on the system.

It is to be understood that the flowchart shown in FIG. 4 and described above is only an example and that steps may be added, combined, or modified, without departing from the scope of the embodiments.

An overview of theoretical considerations is discussed below followed by a description of example algorithms.

In the following example, CRC16 is used. If the optimal 16-bit polynomial can be found, there will be a fast algorithm for the search that is made in the worst case by a fast hash and a search on a WAVL of $N/2^{16}$ elements, where N is the number of items configured. For example, for 1M items, just $2^{20}/2^{16}=2^4$ will be stored in a WAVL sub-tree, so only four accesses are needed.

In one example, taking the best case of N sequential items configured (with N=64K, 128K, . . . , 2M), the trend of the number of polynomials having a specific maximum number of collisions for a specific item set can be shown such that the best-case scenario 32K polynomials (50% of the entire possible set) bring to a uniform distribution of the hash conflicting items, which is what is needed for the algorithm to work. The minimum of the maximum number of collisions is $N/2^{16}$, meaning that this is also the number of items in any WAVL tree 34 of the hash table 30 (FIG. 3).

The following takes into account other worse case scenarios, such as the one related to the uniform distribution of the items set and to the full random distribution of the same. It may be shown that the worst case is related to random distribution of the "matchable" items (random distribution), but also in that case the majority of the polynomials have the minimum maximum number of collisions in a small range close to 32 (range 30-45) and that the peak is at around 10K. This means that if $\lceil N/M \rceil$ is the minimum maximum number of collisions on a sequential distribution, it looks like the minimum maximum number of collisions in a random distribution is close to $2*\lceil N/M \rceil$. However, as N elements have to be distributed on the hash table, there will be one or multiple slots in the hash table such that they contain less than $\lceil N/M \rceil$ items on the related WAVL tree. This means that overall the distribution is almost optimal also in this case.

As the worst case is related to the random distribution, it can be shown that no matter what random item set is chosen, the trends of the number of polynomials vs. the maximum number of collisions are overlapping, meaning that the behavior is generally generic. It can also be shown that in the generic worst case, almost 50% of the polynomials give a good distribution of the items on the hash table and related WAVL trees. In this example, it can be shown that the optimal polynomials are in a range between 10 and 1K (at 31 max collisions), depending on the chosen random item set, and the peak of the polynomial distribution appears to be located around 32 maximum conflicts for 1M items (i.e. $2*\lceil N/M \rceil$ in this case)

It can be seen that for a low number of items (close to M) the peak of the polynomials distribution is around $4*\lceil N/M \rceil$, but it stabilizes to $2*\lceil N/M \rceil$ when N increases. This is because for a high number of items the hash table starts to get a more uniform distribution of the conflicts.

In summary, taking into account all of the above cases, an optimal polynomial can be found in order to compute the CRC16 that distributes almost uniformly a specific set of N items on a hash table of 64K slots.

Described below is an example of an algorithm that may be used to identify optimal CRC polynomials mapping a generic set of items to a uniformly distributed hash table. Also described below is usage of the algorithm to extend TCAM matching capability to the limit allowed by the CPU power on the system.

The following example may be used to find the maximum number of items N that the system can support, knowing the CPU power and the interfaces that the network processor has to manage. The parameters used in the example are defined as follows:

$T_{CAM}$: Time spent on standard TCAM operations h: Time spent on hash computation (e.g., CRC 16)

k: Time spent on a WAVL compare

N: Number of items to match for punting

M: Size of the hash table ($2^{16}$)

$P_g$ Packet size $I_{br}$: Interface bit rate $I_N$: Number of interfaces managed by the same TCAM The time spent in TCAM may be calculated as follows:

$$\text{Time spent in } TCAM = T_{CAM} + h + k \cdot \log_2\left(\frac{N}{M}\right)$$

The time to process one packet may be calculated as follows:

$$\text{Time processing one packet} = \frac{8 \cdot P_s}{I_{br} \cdot I_N}$$

The N (number of items) allowed by the system such as not to delay any packet forwarding may be defined as follows:

$$T_{CAM} + h + k \cdot \log_2\left(\frac{N}{M}\right) \le \frac{8 \cdot P_s}{I_{br} \cdot I_N}$$

Meaning:

$$N \le M \cdot 2^{\frac{1}{k}\left[\frac{8 \cdot P_s}{I_{br} \cdot I_N} - T_{CAM} - h\right]}$$

In one example, N is calculated using the following values:

$T_{CAM}$=50 cycles@2 GHz=25·10$^{-9}$ h=10 cycles @ 2 GHz=5

K=10 cycles @ 2 GHz=5·10$^{-9}$

Ps=60 bytes (min IP is 40+some overhead for L1+L2)

$I_{br}$=1 Gbps $I_N$=8

M=$2^{16}$

This results in N=$2^{16} \cdot 2^6$=4M, and shows that the system can support up to 4M punting related matches on top of the standard TCAM matches. For one example network device, this is about 64K (e.g., hardware limit on one kind of platform), which improves conventional matching functionalities on similar routers and switches.

In order to select the "optimal" polynomial for the CRC, it may be needed to iterate on all of the configured set on N items (e.g., tuples) to match and on the all the possible polynomials. The complexity of the algorithm therefore appears to be O(M*N).

Based on the results discussed above, about 50% of the polynomials provide an almost uniform distribution of the items on M WAVL trees of the hash table. The optimal polynomials (i.e., the ones that provide the lowest number of max collisions) are in a range between 10 and 1K out of 64K (based on above example). It may also be noted that having WAVL trees with $2*\lceil N/M \rceil$, $2*\lceil N/M \rceil$+1, $2*\lceil N/M \rceil$+2 or $2*\lceil N/M \rceil$+3 is more or less the same with respect to the complexity of the search algorithm on the WAVL tree as $\log(2*\lceil N/M \rceil) \approx \log(2*\lceil N/M \rceil+3)$ (e.g., for N=1M and M=$2^{16}$, $\log(2*\lceil N/M \rceil)=\log(32)=5$ and $\log(2*\lceil N/M \rceil+4)=\log(35)=5.12$, so basically about the same search complexity.

In order to find the optimal algorithm, it may be determined what is the best number of iterations on the polynomials needed to find the optimal one (to avoid brute force searches). In general this means, for high values of N (that is the most interesting use case), catching the maximum number of iterations that allows one to find a polynomial with a maximum number of conflicts of $2*\lceil N/M \rceil$. Simulations may also be performed for a maximum number of conflicts of 2*⌈N/M⌉+1, 2*⌈N/M⌉+2 and 2*⌈N/M⌉+3 (that as noted above, give an almost optimal distribution).

Defining with p(i) the probability density to find, with "i" iterations, the "optimal" polynomial, here one can find the results of the simulations assuming as "optimal" polynomial the one bringing respectively 2*⌈N/M⌉, 2*⌈N/M⌉+1, 2*⌈N/M⌉+2 and 2*⌈N/M⌉+3 maximum conflicts. Aggregating the probability density data into the related probability distributions curves, the overall probability distribution to find the optimal polynomial in i iterations can be shown.

Starting from the polynomial 0x8000 (that is the first one giving full 16 bits CRC results), in all cases after a maximum of 278 iterations it is possible to find either an optimal polynomial or an almost optimal one (i.e., with almost the same search complexity). This means that freezing the number of polynomials iterations at 278, the complexity of the algorithm is no more O(M*N) but only O(N).

Moreover, it may be noted that the search algorithm for 2*⌈N/M⌉ max collisions or 2*⌈N/M⌉+3 collisions is almost the same. This means that looking for an "optimal" polynomial bringing to a max collisions of 2*⌈N/M⌉+3, only six iterations are needed for converge, in this example.

It can also be shown that the only meaningful iterations are the ones related to "odd" polynomials (i.e., polynomials for which the binary representation has bit 0 set to 1). If only odd polynomials are taken into account on the iterations, the maximum number of iterations needed to find the optimal (2*⌈N/M⌉+3)-polynomial is just three.

To be conservative (extreme safe side) 32 iterations on the odd polynomials will be considered to search for the optimal one, in one embodiment of the algorithm.

It may also be noted that, as explained above, there is a limit on the maximum number of matchable items, that even if it is much higher than the TCAM capacity, it is finite and defined by the following formula:

$$N_{max} = M \cdot 2^{\frac{1}{k}\left[\frac{8 \cdot P - s}{l_{br} \cdot l_N} - T_{CAM} - h\right]}$$

All these parameters are available on the processor, with h, k and $T_{CAM}$ being evaluated at boot time. At boot time, a training sequence of Q elements may be used to fill up the hash table and its WAVL trees in order to calculate these CPU time constants as follows:

$$h = \frac{\sum_{i=1}^{Q} \text{crc\_exec\_time}(i)}{Q}$$

$$k = \frac{2}{Q} \sum_{i=\frac{Q}{2}}^{Q} \frac{\text{wavel\_access\_time}(i)}{\log(i)}$$

$$T_{CAM} = \frac{\sum_{i=1}^{Q} \text{tcam\_exec\_time}(i)}{Q}$$

It is to be understood that the algorithms described herein are examples and that modifications may be made without departing from the scope of the embodiments. The above data may be used in one or more implementations, as described below.

Figure 5:
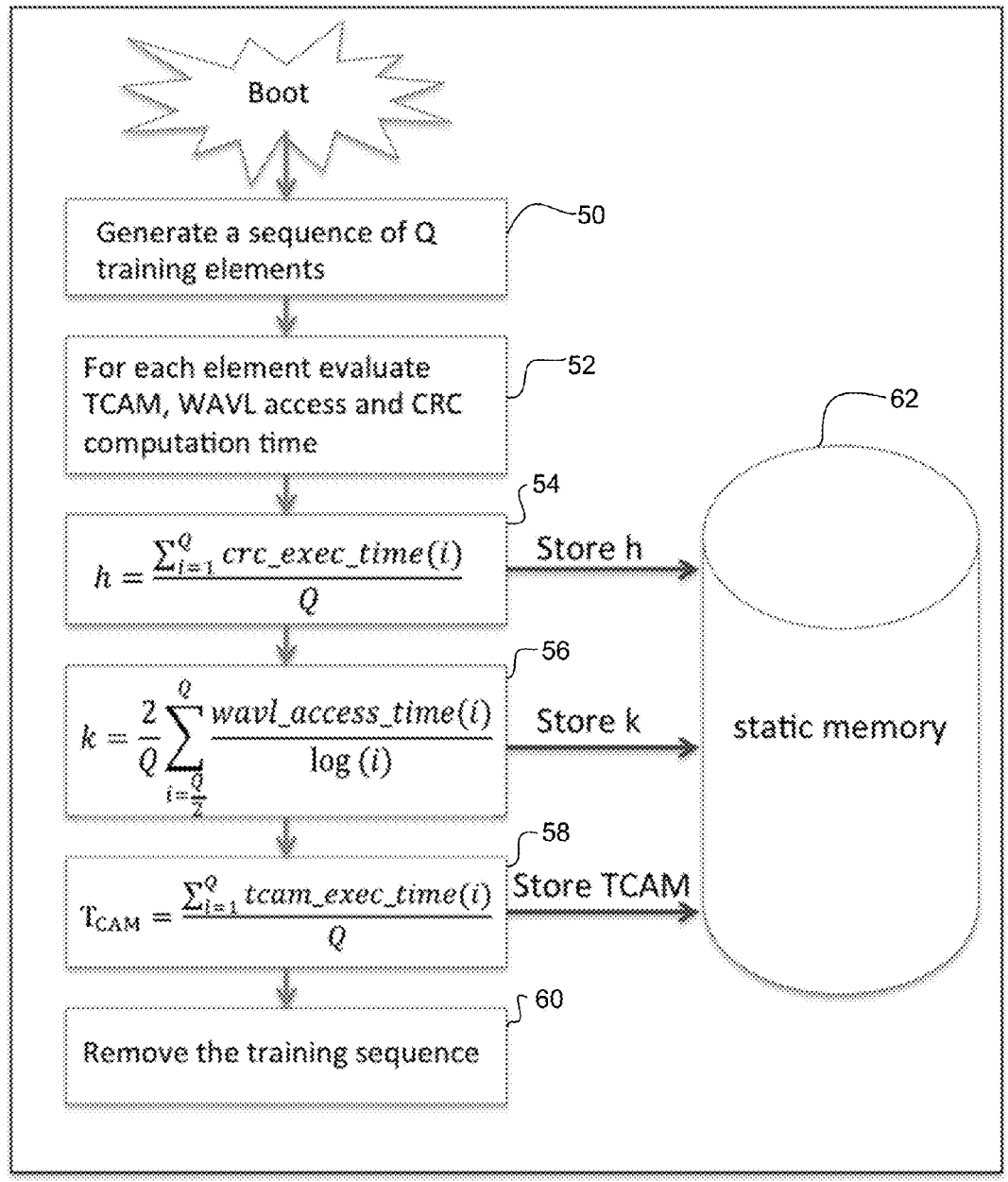
FIG. 5 illustrates a process performed at boot time to define parameters for use in the flow matching optimization, in accordance with one embodiment.

FIG. 5 illustrates one example of a process that may be performed at boot time to define parameters used in determining the maximum number of matchable items (described below with respect to FIG. 7), in accordance with one embodiment. At step 50, a sequence of Q training elements are generated. For each element, TCAM, WAVL access, and CRC computation time are evaluated (step 52). The time spent on hash computation (h) is calculated at step 54. The time spent on a WAVL comparison (k) is calculated at step 56. The time spent on standard TCAM operations ($T_{CAM}$) is calculated at step 58. These parameters are stored in static memory 62. The training sequence is then removed (step 60).

Figure 6:
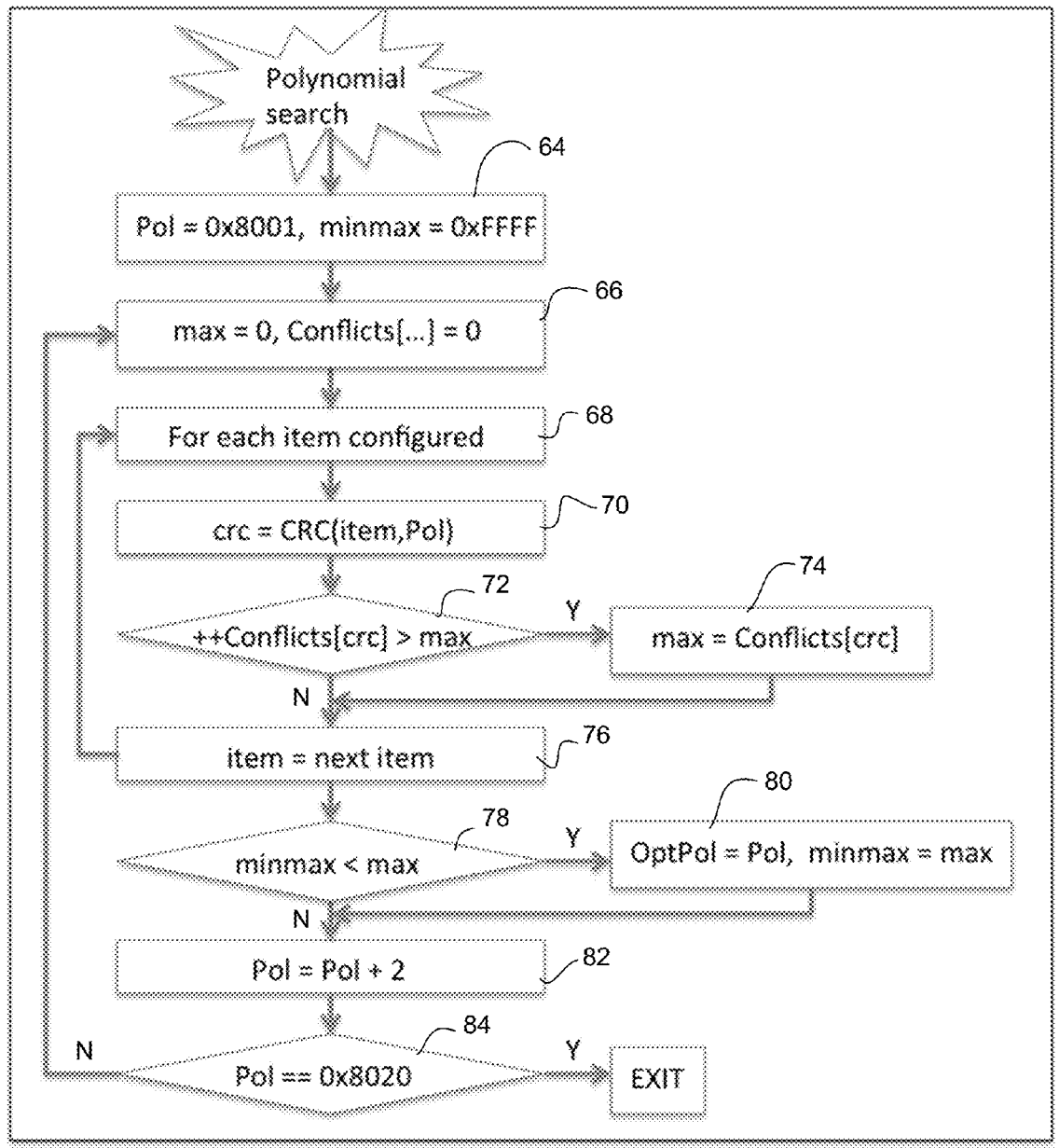
FIG. 6 illustrates a process for performing an optimal CRC polynomial search, in accordance with one embodiment.

FIG. 6 illustrates a runtime optimal polynomial retrieval, in accordance with one embodiment. At step 64, the process starts with the polynomial equal to 0x8001, with minmax=0xFFFF (e.g., for CRC16). As previously described, only odd polynomials are taken into account on iterations to find the optimal polynomial. Steps 66, 68, 70, 72, 74, and 76 are performed for each configured item. The polynomial that gives the lowest number of maximum collisions (conflicts) is identified as the optimum polynomial (steps 72, 74, 78, 80, 82, and 84). The optimal CRC polynomial search shown in FIG. 6 is performed during the match item configuration procedure described below with respect to FIG. 7.

Figure 7:
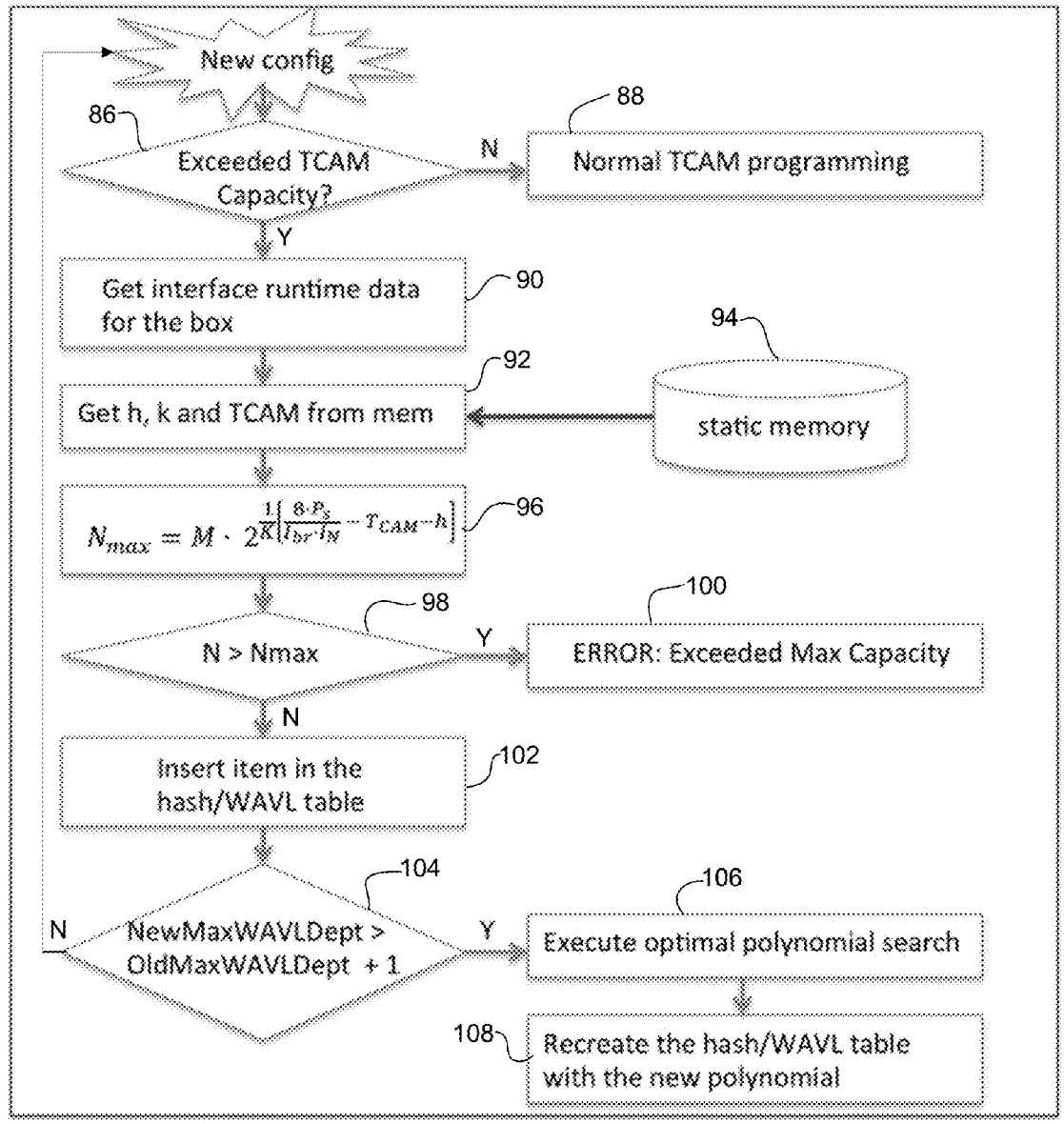
FIG. 7 illustrates a process for updating a hash table with the optimal CRC polynomial, in accordance with one embodiment.

FIG. 7 illustrates one example of a process performed when a new item is configured on the list of matching criteria, in accordance with one embodiment. At step 86, it is determined if the TCAM capacity is exceeded. If it is not exceeded, regular TCAM programming is used (step 88). If the TCAM capacity is exceeded, the interface runtime data for the network device is obtained (step 90). Parameters for h, k and $T_{CAM}$, (calculated as shown in FIG. 5) are retrieved from static memory 94 (step 92). $N_{MAX}$ is calculated at step 96. If N>Nmax, the maximum capacity is exceeded and an error is identified (steps 98 and 100). If Nmax is not exceeded, the item is inserted in the hash/WAVL table (step 102). If a new maximum WAVL depth is greater than the old maximum WAVL depth+1, the optimal polynomial search is executed (as shown in FIG. 6) and the hash/WAVL table is recreated with the new polynomial (steps 104, 106, and 108).

It is to be understood that the boot procedure shown in FIG. 5, the optimal CRC polynomial search shown in FIG. 6, and the match item configuration procedure shown in FIG. 7, are only examples and that steps may be added, combined, removed, or modified, without departing from the scope of the embodiments.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   identifying at a network device, a number of items for matching at a hash table, the number of items exceeding matching available with ternary content addressable memory (TCAM) at the network device;
   defining at the network device, an optimal cyclic redundancy check (CRC) polynomial based on the number of items for matching at the hash table;
   generating at the network device, an optimal hash function based on said optimal CRC polynomial to extend packet classification capability at the network device; and
   receiving and classifying packets at the network device;
   wherein said packet classification is performed at the network device based on said generated optimal hash function for use by a controller in communication with the network device and managing flows associated with the network device.

2. The method of claim 1 further comprising filling the hash table defined by said optimal hash function with Adelson-Velskii and Landis (AVL) trees.

3. The method of claim 1 further comprising identifying a maximum number of matchable items based on processor parameters at the network device.

4. The method of claim 3 wherein said maximum number of matchable items is defined by:

$$N_{max} = M \cdot 2^{\frac{1}{K}\left[\frac{8 \cdot P_s}{I_{br} \cdot I_N} - T_{CAM} - h\right]}$$

wherein:
$T_{CAM}$=time spent on standard TCAM (Ternary Content Addressable Memory) operations;
h=time spent on hash computation;
K=time spent on an AVL comparison;
n=number of items to match;
m=size of a hash table; and
$P_s$=packet size.

5. The method of claim 4 further comprising calculating parameters for the $N_{max}$ equation at boot time.

6. The method of claim 3 further comprising:
identifying a new match item;
calculating the maximum number items to match; and
inserting the new match item in the hash table if the number of matchable items is less than the maximum number of items to match.

7. The method of claim 1 wherein defining an optimal CRC polynomial comprises performing a polynomial search.

8. The method of claim 1 wherein the network device comprises a software-defined network (SDN) node in communication with an SDN controller.

9. The method of claim 1 wherein said optimal CRC polynomial maps a generic set of said items to the hash table, wherein the hash table is uniformly distributed.

10. An apparatus comprising:
a processor for identifying a number of items for matching at a hash table, the number of items exceeding matching available with ternary content addressable memory (TCAM), defining an optimal cyclic redundancy check (CRC) polynomial based on the number of items for matching at the hash table, generating an optimal hash function based on said optimal CRC polynomial to extend packet classification capability at the apparatus, and classifying packets; and
memory for storing the hash table;
wherein said packet classification is performed at the apparatus based on said generated optimal hash function for use by a controller in communication with the apparatus and managing flows associated with the apparatus.

11. The apparatus of claim 10 wherein the processor is further operable to fill the hash table defined by said optimal hash function with Adelson-Velskii and Landis (AVL) trees.

12. The apparatus of claim 10 wherein the processor is further operable to identify a maximum number of matchable items based on processor parameters at the network device.

13. The apparatus of claim 12 wherein said maximum number of matchable items is defined by:

$$N_{max} = M \cdot 2^{\frac{1}{K}\left[\frac{8 \cdot P_s}{I_{br} \cdot I_N} - T_{CAM} - h\right]}$$

wherein:
$T_{CAM}$=time spent on standard TCAM (Ternary Content Addressable Memory) operations;
h=time spent on hash computation;
K=time spent on an AVL comparison;
n=number of items to match;
m=size of a hash table; and
$P_s$=packet size.

14. The apparatus of claim 13 wherein the processor is further operable to calculate parameters for the $N_{max}$ equation at boot time.

15. The apparatus of claim 12 wherein the processor is further operable to:
identify a new match item;
calculate the maximum number items to match; and
insert the new match item in the hash table if the number of matchable items is less than the maximum number of items to match.

16. The apparatus of claim 10 wherein defining an optimal CRC polynomial comprises performing a polynomial search.

17. The apparatus of claim 10 wherein the apparatus comprises a software-defined network (SDN) node in communication with an SDN controller.

18. The apparatus of claim 10 wherein said optimal CRC polynomial maps a generic set of said items to the hash table, wherein the hash table is uniformly distributed.

19. An apparatus comprising:
means for identifying a number of items for matching at a hash table, the number of items exceeding matching available with ternary content addressable memory (TCAM);
means for defining an optimal cyclic redundancy check (CRC) polynomial based on the number of items for matching at the hash table, and
means for generating, an optimal hash function based on said optimal CRC polynomial to extend packet classification capability at the apparatus;
wherein said packet classification is performed at the apparatus based on said generated optimal hash function for use by a controller in communication with the apparatus and managing flows associated with the apparatus.

20. The apparatus of claim 19 wherein said optimal CRC polynomial maps a generic set of said items to the hash table, wherein the hash table is uniformly distributed.

* * * * *